May 6, 1947.　　　　G. E. FOREMAN　　　　2,419,947
SIGNAL SNAP HOOK
Filed Jan. 23, 1945

*Inventor*
GERALD ELLIS FOREMAN

By  *P. E. Bush*
　　　　　*Attorney*

Patented May 6, 1947

2,419,947

UNITED STATES PATENT OFFICE 2,419,947

SIGNAL SNAP HOOK

Gerald Ellis Foreman, United States Navy

Application January 23, 1945, Serial No. 574,176

1 Claim. (Cl. 24—239)

(Granted under the act of March 3, 1883, as amended April 30, 1928; 370 O. G. 757)

This invention relates to improvements in light weight snap hooks for quickly and positively running up signal flags.

An object of this invention is to provide an improved light weight signal snap hook.

Another object of this invention is to provide a signal snap hook that is readily secured in a positive manner.

These and other objects are obtained by the mechanism illustrated in the accompanying drawing, in which.

Figure 1:
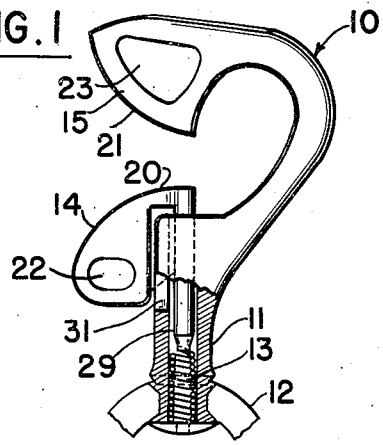
Fig. 1 is a side view of the snap hook of this invention in the retracted position partially in cross section.

To facilitate flag hoist signalling, the snap hook 10 of this invention is seized to the tail-line of the pennant and the upper end of the halyard to engage the ring seized to the top of the hoist of the pennant ring below, or the ring at the lower end of the halyard.

The shank 11 of the snap hook 10 is swivelly connected at the bottom to a ring 12 by means of a groove 25 which is first formed by machining off the bottom and inserting in a correspondingly seized drilled hole, tapped at both ends, in the ring 12 and then headed up at the end into a similar outer groove 27, flared end section 26.

Figure 4:
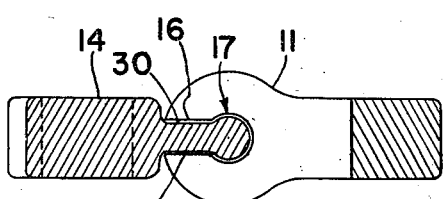
Fig. 4 is a sectional view taken along the line 4—4 of Fig. 2.

The lower shank 11 of hook 10 is also centrally drilled as shown by the axial channel 17 extending the full length of the shank 11 except for the hooked section 26. A wall of the shank 11 is also slotted as shown at 16, which slot extends inwardly to the axial channel 17 and downward for a sufficient distance to accommodate the movable jaw member or mouse 14 when it assumes its retracted position, as shown in Fig. 1. The width of the slot 16 is shown somewhat less than the diameter of the hole 17 in order to prevent the mouse or movable jaw member from falling out, as best shown in Fig. 4. The mouse 14 has a downwardly extending pin or plunger section 29 for insertion in the drilled hole 17 which bears against a compression spring 13 inserted in the hole 17. The mouse 14, adjacent the pin section 29 has machined surfaces 30, 31, as shown forming a web integrally connecting the lip and the plunger and extending for a sufficient distance so that engagement with the slotted section 16 of the shank is assured for the length of travel of the mouse 14 or movable jaw member. The mouse 14 is acted upon by the force of gravity at all times which tends to force it into the open position except for compression of the spring 13 which is sufficient to overcome both the moving and static friction in order to return the mouse 14 to the closed position as soon as any foreign downwardly entering pressure is removed.

The relative position of the tongue and groove relationship between the shank and the movable jaw members could be reversed.

Figure 2:
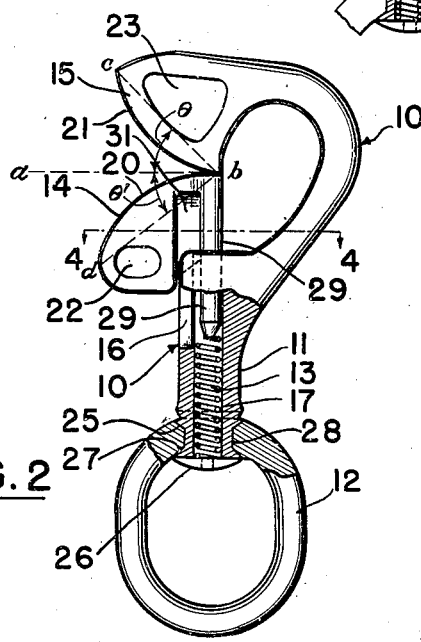
Fig. 2 is a similar sectional side view of the lower jaw in the closed position with a section of the shank removed.
Figure 3:
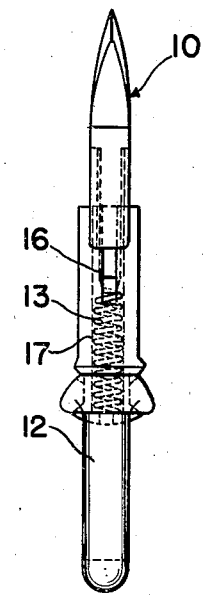
Fig. 3 is a side view of Fig. 2.

The shank 11 extends curvedly, upwardly, into the stationary jaw member section 15 which has section 23 removed for keeping its weight at a minimum. Similarly, suitable section 22 has been removed from the movable jaw member 14. The shape of the lips 20, 21 of the respective jaw members 14 and 15 are critical with this invention, in that they present an extremely wide mouth snap hoop, as best shown in Fig. 2, in the closed position. These lips 20, 21 are curved in a smooth manner so that at the mouth and throat, they are parallel to each other, best shown in the closed position of Fig. 2.

The extension of shank 11 curvedly and upwardly forms a hook which is formed, in conjunction with the movable jaw member 14, to surround an reentrant enclosure. Reentrant, as herein used, means the extending of the enclosure in both directions from the point of contact of the movable jaw member and the hook substantially in the direction of movement of the movable jaw member. This reentrant enclosure thus forms a concave hook which will function as an open hook in the event of the movable jaw member failing to close.

The two jaw members 14 and 15 are normally in the closed position due to the action of the spring 13. As the working of this snap hook depends solely on the pressure of the entering ring (not shown) on the lips, it is not necessary that the operator grasp the hook in any particular manner for operation. Formerly, with the closed mouth of the snap hooks, it was necessary that the ring enter directly into the mouth or throat.

This ease of operation is due to the flaring of the lips in this inventor's device. Reference is made to Figure 2 of the drawing in which the line $ab$ is the tangent at the point of contact of the two arcs of the lips 20 and 21. These arcs may be substantially circular. $bc$ is the chord of the arc of lip 21 and $bd$ the chord of the arc of lip 20. Both chords extend between the extremities of curvature of their respective arcs. The angle measured between the tangent $ab$ and chord $bc$ is the angle of flare $\theta$ of lip 21 and that between tangent $ab$ and chord $bd$ the angle of flare $\theta'$ of lip 20. The sum of these two angles ($\theta+\theta'$) is the total angular flare of the lips since it measures the angular departure of the lips from their common tangent.

The angle of flare of each lip is seen to be approximately 45° and the total flare substantially 90°.

With the smooth outwardly flared lips of this invention, best shown in Fig. 2, it is practically impossible to loose a hoist as the snap hook 10 now successfully engages quickly and efficiently on the first attempt. Furthermore, the lip 20 of the movable jaw member 14 is of sufficient width that it is possible under adverse conditions such as being coated with grease, to practically and readily release the pennant.

The invention described herein may be manufactured and used by or for the Government of the United States of America, for governmental purposes without the payment of any royalties thereon or therefor.

What is claimed is:

A wide mouthed quick acting snap hook comprising a shank, said shank having an axial channel therein, an axial wall of said shank having a partial slot extending therethrough to said axial channel, an outwardly extending hook jaw integral with said shank forming a part of a reentrant enclosure, a movable jaw completing the reentrant enclosure when in closed position, a plunger integral with said movable jaw slidably mounted in said axial channel, spring means positioned within said axial channel biasing said plunger and movable jaw to closed position against said hook jaw, an outwardly flared lip integral with said integral hook jaw, a similar outwardly flared lip integral with said movable jaw, both said lips flaring outwardly from their point of contact to form an entrant angle of substantially 90°, and a web extending through said slot integrally connecting said plunger and said flared lip of said movable jaw.

GERALD ELLIS FOREMAN.

REFERENCES CITED

The following references are of record in the file of this patent:

UNITED STATES PATENTS

| Number | Name | Date |
| --- | --- | --- |
| 509,200 | Covert | Nov. 21, 1893 |
| 613,139 | Grant | Oct. 25, 1898 |
| 1,444,311 | Kasch | Feb. 6, 1923 |
| 202,898 | Wallach | Apr. 23, 1878 |